CONTROL/DISPLAY APPARATUS

Original Filed Sept. 20, 1965 4 Sheets-Sheet 1

CONTROL/DISPLAY APPARATUS

Original Filed Sept. 20, 1965 4 Sheets-Sheet 2

| | 11 10 9 8 7 6 5 4 3 2 1 0 | |
|---|---|---|
| (a) | Op CODE \| OPT \| OPERAND ADDRESS OR ADDR MODIFIER | INSTRUCTION |
| (b) | 0 0 0 0 0 0 0 0 0 0 1 1 1 | BOV CODE |
| (c) | X X X X X X X X X 1 U B | X COORDINATE |
| (d) | Y Y Y Y Y Y Y Y Y 0 W E | Y COORDINATE |
| (e) | 0 0 0 0 0 0 0 0 0 1 1 1 1 | BOS CODE |
| (f) | X X X X X X X X X 1 1 0 | X COORDINATE |
| (g) | Y Y Y Y Y Y Y Y Y 0 0 0 | Y COORDINATE |
| (h) | S S S S S S C C C C M E | SYMBOL |
| (i) | 0 0 0 0 0 0 0 0 1 1 1 1 1 | EOP CODE |

United States Patent Office

Re. 28,238
Reissued Nov. 12, 1974

28,238
CONTROL/DISPLAY APPARATUS

Robert A. Koster, Santa Ana, Calif., assignor to The Bunker-Ramo Corp., Oak Brook, Ill.

Original No. 3,389,404, dated June 18, 1968, Ser. No. 488,639, Sept. 20, 1965. Application for reissue May 7, 1973, Ser. No. 358,039
Int. Cl. G06f *3/14*
U.S. Cl. 340—172.5 19 Claims

Matter enclosed in heavy brackets [ ] appears in the original patent but forms no part of this reissue specification; matter printed in italics indicates the additions made by reissue.

ABSTRACT OF THE DISCLOSURE

A control and display console for facilitating communication between a human operator and a digital data processing system. The console includes a stored program data processor which performs control functions as well as display functions. The processor includes a memory which stores both instruction words and operand words. The operand words include both symbol and display control words. The instruction words are organized into an executive program and a plurality of control routines. At least one of the instruction words specifies a display operation. The executive program causes the periodic execution of the display operation and the execution of control routines specified by operator actuated keys between periodic executions of said display operation.

This invention relates generally to digital data processing systems and more particularly to control and display apparatus for use therein.

Many different control and display consoles have been developed recently to facilitate communication between a human operator and a data processing system or, more particularly, a digital computer. Such consoles generally include a display device such as a cathode ray tube and one or more keyboards which permit an operator to input data to the computer, to cause data within the computer to be displayed, and to modify data within the computer.

The earliest control and display consoles were capable of performing only relatively simple tasks. Primarily, they were comprised of keyboards including a plurality of manually actuatable keys, each of which could be actuated to dispatch a unique code directly to the computer. The computer in turn would provide digital data back to the console, which data would be converted by digital-to-analog equipment to deflection signals for controlling the cathode ray tube. Other data provided by the computer was used, e.g., to illuminate certain indicator lights, etc. Thus, these early consoles did little more than permit selected codes to be sent to the computer and display information responsive to data provided by the computer; that is to say, little if any data processing or modification was performed by the console. Rather, the computer in response to operator commands did substantially all of the processing.

Subsequently introduced control and display consoles were more sophisticated and did include means actually capable of processing data, thus permitting the operator to more easily perform certain functions at the console, such as message composing, editing, abstracting, updating, etc., independently of the computer. One such console having these capabilities is disclosed in U.S. patent application Ser. No. 348,430, filed March 2, 1964, by Robert A. Koster et al. now Patent No. 3,346,853 and assigned to the same assignee as the present application.

The console disclosed in the cited patent application embodies its own memory into and out of which large blocks of data can be transferred to and from a digital computer. The data stored in the console memory is visually presented on a display means, preferably a cathode ray tube, and can consist of symbols and alphanumeric data as wall as graphic data, including plotted symbols, straight line drawings, graphs, and charts. Whatever data is stored in the console memory is cyclically presented on the display means and the logic circuitry of the console apparatus permits an operator to perform various operations on that data by actuating selected control keys. Examples of such operations are:

(1) "Create cursor," which displays a cursor symbol on the cathode ray tube, which symbol can be moved in response to the movement of a manual control;

(2) "Delete line segment," which enables an identified line segment in a graphic display to be deleted;

(3) "Delete word," which enables an identified word in a display of textual material to be deleted;

(4) "Delete line," which enables an identified line of text to be deleted; and (5) "Copy word" or "copy line," which respectively enables an identified word or line to be copied into identified memory locations and displayed in corresponding display locations.

The details of many other control operations are set forth in the cited patent application.

The various operations that are performed by the console disclosed in the cited patent application are performed by hardware which is actuated in response to the manual actuation of each of the control keys. When no control operations are to be performed, the cyclic accessing of the memory continues to thus continually refresh the display. When a control operation is to be performed, the appropriate hardware elements will be actuated either after a display cycle has been completed or after a particular memory location has been accessed in the course of a display cycle.

Thus, it can be appreciated that consoles of the type disclosed in the cited patent applications are considerably more capable than their predecessors. However, it is also recognized that hardware provided to perform specific control functions is employed relatively inefficiently. More particularly, inasmuch as it is desirable for the display to be fully refreshed at a flicker-free rate, preferably at least once every sixtieth of a second in synchronism with the electrical power source, and, inasmuch as the time required to refresh the display may in some circumstances be only slightly less than one-sixtieth of a second, the hardware required for display purposes is operating nearly constantly. However, the display hardware is ordinarily idle for a short period after the completion of each display cycle. For example 16 milliseconds may be required to complete a display cycle, thus providing a 0.67 millisecond period out of every 16.67 milliseconds (1/60 of a second) to perform control operations. This represents about a 96% duty cycle for the display hardware, which makes a 4% duty cycle available for the total control hardware. Moreover, most portions of the total control hardware normally are operated even less frequently that the total control hardware, since such portions may be dedicated to the performance of control operations which are initiated relatively infrequently by the console operator. Also, by providing specific hardware to perform all of the control operations, the console is reasonably inflexible inasmuch as it must be physically modified in order to perform any operations other than those for which hardware is specifically provided.

In accordance with the present invention, in lieu of providing special purpose hardware to perform each of a plurality of desired control operations, all control operations are performed by a single hardware group which responds to stored program control. This hardware, in response to programmed commands, performs both the display and control functions. In a preferred embodiment of the invention, the display function is commanded by the stored program, but all of its details are controlled by the hardware which is organized to have an optimum configuration for the display function.

Briefly, the present invention is based upon the recognition that in a control and display console the digital hardware normally required only for display operations can be inexpensively modified to become a stored program data processor without substantially impairing its display efficiency, which processor can also be used to perform the desired control operations. Moreover, by permitting control and display operations in a console to be defined by a stored program, a greater variety of operations, all of which can be easily modified, can be performed with a fixed quantity of hardware than could be performed where special purpose hardware is used to perform specific operations. Moreover, a lesser total amount of hardware is required in an embodiment of the present invention than is required by prior art consoles, since little of it is dedicated to the performance of specific control operations.

The stored program concept is implemented by having a basic general-purpose processor control all console functions. Each control key calls up to a programmed control routine which is executed between refresh cycles of the display. The function of each control key and the display modes can be modified by changing the program, thereby elimintaing costly hardware modifications associated with prior art wired logic consoles. This technique consequently allows the display console to readily adapt to changing system or operational requirements.

The over-all benefits of less hardware are reflected in higher inherent reliability and simplification of maintenance. Hardware reduction is achieved, of course, as a consequence of mechanizing only relatively simple functions, such as loading information into selected registers, transferring information between registers, etc. The hardware that is present is controlled by a control means in response to instruction words accessed from memory. In order to perform a full control operation such as "copy word," a programmed routine consisting of a sequence of many instructions must be executed.

The novel features that are considered characteristic of this invention are set forth with particularity in the appended claims. The invention will best be understood from the following description when read in connnection with the accompanying drawings, in which:

Figure 1:
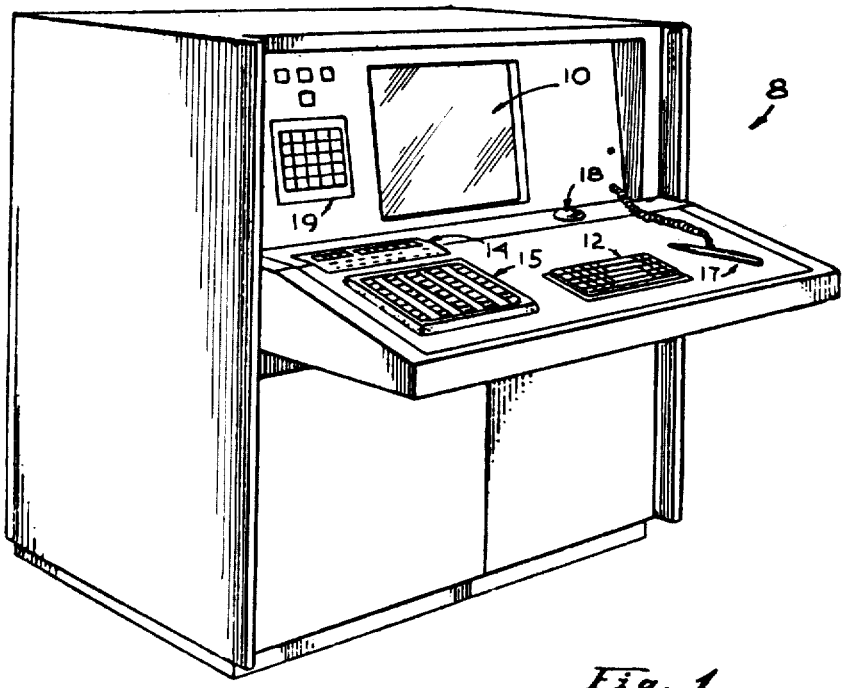
FIGURE 1 is a perspective view illustrating the exterior of a typical control and display console constructed in accordance with the present invention.

Attention is now called to FIG. 1 of the drawings, which illustrates a perspective view of the external configuration of a console 8 which can incorporate the teachings of the present invention. The external appearance of a console constructed in accordance with the present invention can be identical to previous consoles, and, to demonstrate this, FIG. 1 herein is substantially identical to FIG. 1 of the aforecited patent application.

The console 8 includes a display means having a display screen means on which the portion of visible indicia may be controlled. Such display means may be comprised of a cathode ray tube 10 on which both symbol and graphic data can be displayed and associated deflection means act to control the position of indicia which form the display of said symbol and graphic data. As will be seen hereinafter, the information displayed by the cathode ray tube 10 is stored within a memory associated with the console.

In addition to the display means 10, the console is preferably provided with a plurality of keyboards including an alphanumeric keyboard 12, a control keyboard 14, and a program keyboard 15. Each of these keyboards is adapted to be manually controlled by a system operator. The program keyboard 15 is intended to be used for controlling the digital computer 16 (FIG. 2) with which the console is to operate to enable the system operator to selectively initiate operations within the computer. The alphanumeric and control keyboards 12 and 14 are intended to enable an operator to selectively initiate operations with respect to information stored in the memory (FIG. 2) associated with the console, which operations affect the visual display presented to the operator. The console further includes a light gun apparatus 17 and a cursor apparatus 18 which are under the control of the operator to enable him to respectively identify memory locations and specific points on the display cathode ray tube face. The manner in which the light gun and cursor apparatus operate is generally known in the art and is discussed in the aforecited patent application. For most purposes herein, it will merly be assumed that displayed data, such as symbols, and the memory location in which the corresponding symbol information is stored can be identified by the utilization of the light gun. Likewise, it will be assumed without any substantial discussion herein that the cursor control will enable an operator to define particular coordinates on the face of the display cathode ray tube.

In addition to the foregoing, a bank of status lights 19 is provided on the console. These status lights can be controlled either by console associated control apparatus to be discussed herein or by the computer 16. Inasmuch as these status lights are not significant to the present invention and since the utilization of similar lights is known in the art, they will not be discussed in very great detail.

Figure 2:
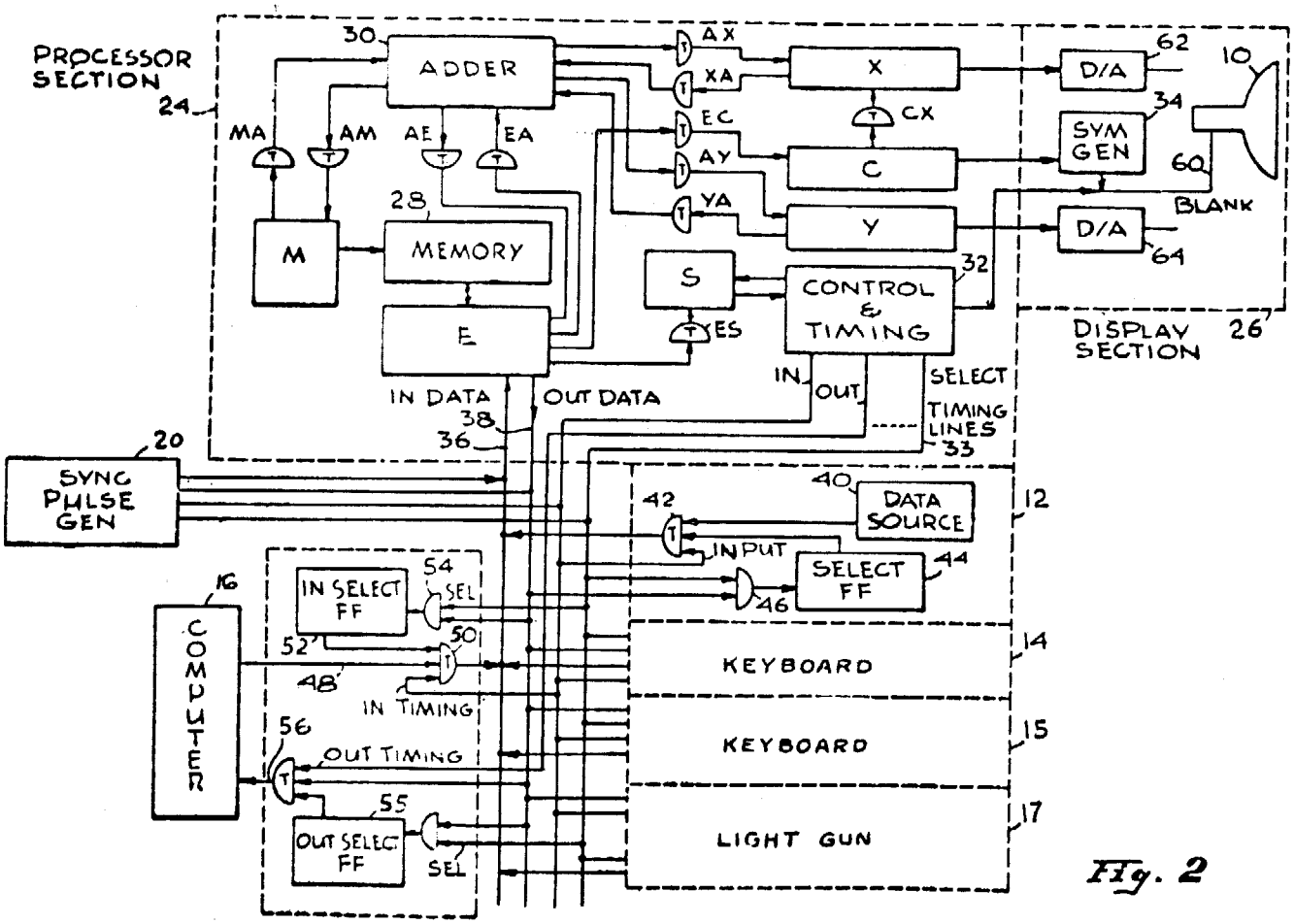
FIG. 2 is a block diagram illustrating the internal configuration of the console and the manner in which it communicates with a digital computer.

Attention is now called to FIG. 2, which illustrates a block diagram of the internal configuration of the console 8. The console can be considered as including a processor section 24 and a display section 26. The processor section is adapted to communicate with each of a plurality of peripheral devices, such as the keyboards 12, 14, and 15, the light gun apparatus 17, the cursor control apparatus 18, computer input and output lines, a sync pulse generator 20, and various other peripheral devices (not shown). All peripheral devices may be divided into three categories: input, output, or input-output devices. Thus a keyboard can be considered an input device, the computer an input-output device, and the status lights an output device. The details of one input device and one input-output device are shown. The other devices are substantially similar to one of these.

The processor section can be considered as being operable in two distinct modes, namely, a display mode in which symbol and display control information is accessed from the memory and displayed by the cathode ray tube, and a processing mode in which non-display operations are performed. In the processing mode, the processor section operates in a manner similar to that of most stored program digital computers; that is, instruction words are accessed in sequences and the operation identified thereby executed prior to a subsequent instruction word being accessed for execution. The instruction set of the processor section 24 contains instructions which transfer operation to the display mode. When the processor section 24 is operating in the processing mode, the display section 26 is inactive.

Now, considering the processor section in greater detail, it is pointed out that the processor section 24 includes a memory 28, a plurality of different full word registers respectively identified as the X, C, Y, S, M, and E registers, an arithmetic or adder circuit 30, a control and timing means 32, and various full word transfer gates for transferring information between registers. The memory 28 includes a plurality of word storing locations each of which can store a single word, which may be used as an instruction word, a symbol code word, a display control word, or for any of several other purposes. The formats of these words will be discussed in conjunction with FIG. 3. The M register comprises a memory address register and is used to hold address information identifying a memory location into or from which a word is to be written or read. More particularly, during a read operation, the contents of the identified memory location will be transferred to the E or exchange register, while during a write operation the contents of the E register will be written into the identified memory location. It will be assumed that the memory 28 is of the destructive readout type and therefore requires that a write operation follow each read operation.

In addition to the M and E registers, an S or state register is provided which is controlled by the control and timing means 32. The control and timing means, on the other hand, is controlled by the S register; that is, in response to an instruction read from the memory and appearing in the E register, the S register is forced into a particular state. The control and timing means 32 then appropriately sequences the S register through the various states necessary to execute the instruction. In each state different register transfers or other data manipulations are performed.

A C register is provided which, during a display operation, functions as a character register for the symbol generator 34. An X register and a Y register are provided which function as X and Y coordinate registers during a display mode and as an accumulator and program address register, respectively, during the processing mode. The processor section 24 in addition includes a plurality of transfer gates, each of which is controlled by the control and timing means 32. Control lines from the means 32 to each of the transfer gates have been deleted in FIG. 2 for the purpose of clarity but, however, such lines should be understood as being present. Likewise, timing lines should be understood as being provided by the means 32 to each of the registers, although such lines also have been deleted from FIG. 2. The transfer gates are each respectively designated by the registers between which they transfer information. Thus, gate ES transfers information from the E to the S register, gate AM from the adder 30 to the M register, gate XA from the X register to the adder 30, etc.

All information provided to the processor section 24 from either the computer or any one of the other peripheral devices is applied to the E register input data bus 36. On the other hand, all output information provided by the processor section 24 appears on the E register output data bus 38. All of the peripheral devices are coupled to the E register in substantially the same manner. The details of the coupling between keyboard 12 and the E register are illustrated and may be considered exemplary. Three common timing lines 33 from means 32 carry input, output, and select pulses which indicate respectively that the input data bus 36 and the E register are prepared to accept a word of data; that the output data bus 38 and the E register are prepared to deliver a word of data to a peripheral device; or that the output data bus 38 and the E register are prepared to deliver a word identifying one select flip-flop (e.g., 44) in one of the peripheral devices (e.g., 12) to be set, while all other select flip-flops (e.g., 52 and 55) will be reset.

Each peripheral device includes a data source 40, which in the case of a keyboard can comprise the key switches and an encoder providing an input word in response to a key actuation. The output of the source 40 is connected to the input of a transfer gate 42 whose output is connected to E register input data bus 36. A second input to gate 42 is derived from the true output terminal of flip-flop 44 which is set in response to a selection code provided by the processor section 24. Each decoding gate 46 responds to a unique code provided from the memory through the E register and the output data bus 38 and accompanied by a select pulse from the control and timing means 32 to set the flip-flop 44 connected to it. The common input timing line 33 from means 32 is also connected to the input of all gates 42. Thus, the processor section 24 can sequentially select and examine all of the peripheral devices to determine whether each has any input data to provide. A sixty cycle sync pulse generator 20 is connected to the E register and control and timing means in substantially the same manner as the keyboards. The computer 16 has a set of input and output lines which are also coupled to the E register and control and timing means in substantially the same manner. More particularly, the computer output line 48 is the data source (equivalent to 40) and is connected to the input of transfer gate 50 whose output is coupled to the E register input data bus 36. The gate 50 is controlled by the true output of flip-flop 52 and the common timing signal from means 32. The flip-flop 52 is set by decoding gate 54 which is responsive to an appropriate selection code and select pulse from line 33. The computer input line 56 is similarly coupled to the E register output data bus 38.

The display section 26 includes the previously mentioned cathode ray tube 10 and symbol generator 34. The symbol generator 34 is responsive to symbol code data entered into the C register for forming symbols on the face of the tube 10. The symbol generator 34 controls a blanking line 60 which functions to blank the cathode ray tube beam. The blanking line is also controlled by the control and timing means 32 which blanks the beam whenever the processor section is operating in the processing mode. First and second digital-to-analog converters 62, 64 are provided for respectively controlling the horizontal and vertical tube deflection means (not shown). The converters 62 and 64 are respectively responsive to the contents of the X and Y registers.

The details of the display section 26 can be substantially the same as those of the display section of the console described in the aforecited patent application, and thus they will not be described in detail herein.

Figures 3, 4:
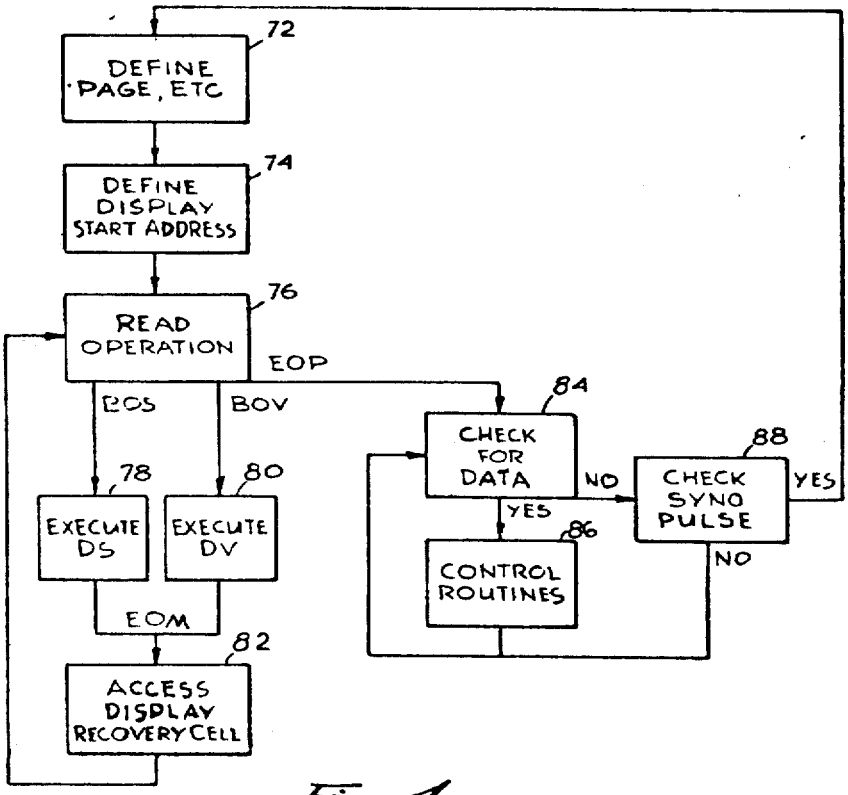
FIG. 3 illustrates typical formats for each of various instruction and control words employed by the console.
FIG. 4 is a flow chart illustrating a simplified typical executive routine performed by an embodiment of the invention.

Attention is now called to FIG. 3, which illustrates the data format of each of several different types of words. For simplicity, it is assumed herein that each word is comprised of twelve bits, bit 0 being the least significant and bit 11 being the most significant. Line (a) illustrates the format of an instruction word. It can be seen that the low order seven bits (0–6) are used to store an address, bit 7 is used to define either a direct or indirect addressing mode, and bits 8–11 are used to specify an operation code. When a direct addressing mode is defined, the contents of the memory location identified by the address in bits 0–6 is the operand. In an indirect addressing mode bits 0–6 define the address of the location storing the operand address. A typical instruction or operation code set is as follows, it being understood, of course, that an actual console can be constructed to respond to a much larger set:

Load (LD)—the Load operation code causes the contents of the operand address to be transferred to the accumulator (X register).

Store (ST)—the Store operation code causes the contents of the accumulator to replace the contents of the operand address.

Extract (EX)—the Extract operation code causes the bit-by-bit logical "and" of the operand and the contents of the accumulator to be placed in the accumulator.

Merge (MG)—the Merge operation code causes the bit-by-bit logical "or" of the operand and the contents of the accumulator to be placed in the accumulator.

Add (AD)—the Add operation code causes the contents of the accumulator plus the contents of the operand address to be placed in the accumulator.

Branch Unconditional (BU)—the Branch Unconditional operation code causes the contents of the operand address to be the next instruction.

Branch On X=0 (BZ)—the Branch On X=0 operation code causes the contents of the operand address to be the next instruction if the contents of the accumulator are equal to zero. If the accumulator is non-zero, the next instruction in the normal sequence is accessed and the BZ instruction does not cause any operation.

Input (IN)—The Input operation code causes the input timing line 33 to be activated and the word taken from the input data bus 36 to replace the contents of the operand address.

Output (OT)—the Output operation code causes the contents of the operand address to be placed on the output data bus 38 and the output timing line 33 to be activated.

Display Symbol (DS)—the Display Symbol operation code causes a display operation to be initiated, with the contents of the operand address being interpreted as the X coordinate of the initial positioning of the display operation.

Select (SL)—the Select operation code causes the select flip-flop in the peripheral device (e.g., keyboard) specified by the operand to be set.

Display Vector (DV)—the Display Vector operation code causes a display operation to be initiated, with the contents of the operand address being interpreted as the X coordinate of the initial positioning of the display operation.

Prior to considering the formats of the other words illustrated in FIG. 3, the display symbol and display vector operations will be briefly considered and distinguished. In the display vector mode, words accessed from memory are alternately interpreted as X and Y coordinates, which together define a point on the cathode ray tube face. The beginning of a vector string is identified by a "beginning of vector" (BOV) code, line (b), FIG. 3. X and Y coordinate codes are illustrated in lines (c) and (d), nine bits in each code being used to identify one of 512 X and Y locations, respectively, and three bits in each code being used for control purposes. The following exemplary control bits can be employed to identify the indicated functions:

B=1 causes preceding vector to blink;

U=1 causes the cathode ray tube beam to be unblanked, thus drawing a vector between the previous and present set of coordinates;

W=1 causes a wide stroke to be drawn;

E=1 identifies the end of a message; i.e., the end of a vector string.

A display symbol string is begun by a "beginning of symbol" (BOS) code [line (e)]. In the display symbol mode, positionining information is not required for each symbol to be displayed. Thus, the first and second words following a BOS code are interpreted as X and Y coordinates [lines (f) and (g)] and the third word as a symbol. Subsequent words are interpreted as symbols which are successively drawn to the right along a line. When the right end of a line is reached, the next symbol is drawn at the left end of a lower line. The symbol string is terminated by an "end of message" bit E in a symbol words. If M=1 in a symbol words, a marker, instead of the specified symbol, is generated. The other control bits C may control size, blinking, or other characteristics of the displayed symbol. An "end of page" (EOP) [line (i)] code signified the end of the display.

Attention is now called to FIG. 4, which illustrates a flow chart describing a typical executive routine through which the processor section sequences in order to execute control and display operations. Box 72 represents the starting point for the executive routine in which various memory accesses are made to see what information is to be displayed. The display information stored in memory is divided into a plurality of pages, e.g., page A, page B, etc. A page includes all that information which is displayed at any one time. Thus, the information in page A can be displayed and then, if the operator desires, he can initiate a control operation to change the contents of a cell accessed during the step depicted by box 72 to define page B, for example. During the step represented by box 74, a table look-up operation will be initiated to determine the starting address for the page to be displayed, and during the box 76 step the contents of this starting address will be accessed. If a "beginning of symbol" (BOS) code is accessed, the system will then execute the "display symbol" (DS) instruction (box 78). If a "beginning of vector" (BOV) code is accessed, the "display vector" (DV) instruction (box 80) will be next executed. When an "end of message" (EOM) bit is recognized, the display instructions will terminate and the "display return" cell (box 82) will be accessed from memory to define the next instruction. The program then loops back to box 76. A typical page of display might require the program to loop through boxes 76, 78, 80, and 82 many times.

When an "end of page" (EOP) code is read during the step represented by box 76, it indicates that everything to be displayed during this cycle has already been displayed, and thus the program enters box 64 in which the various devices connected to the input bus 36 are checked to determine whether they have data for the processor. This condition will exist if the operator has used the keyboards to, e.g., initiate a control operation such "display page B," "copy word," etc. If data is waiting, box 86 will be entered to execute the necessary control routines to perform the identified control operations. After box 86, the system returns to box 84. If no data is waiting, the system progresses to box 88 to determine whether a sync pulse has been generated by the pulse generator 20 (FIG. 2). The pulse generator is, of course, examined in the same manner as are the other peripheral devices. If the sync pulse has been generated, the system progresses again to box 72 to start another display cycle. If the sync pulse has not yet been generated, the system waits by looping through boxes 84 and 88 to again check for data and the sync pulse.

The sync pulses generated by the sync pulse generator 20 occur at a rate which is sufficient to refresh the display for flicker-free viewing, which ordinarily is on the order of 60 times per second. Each sync pulse has a duration which is relatively long compared to the clock frequency or memory access times. For example, let it be assumed that a memory cycle takes about 3 microseconds and the duration of a sync pulse is 100 microseconds. If the processor examines the sync pulse generator 20 during this 100 microsecond period, a non-zero word will be sent to the processor to thus initiate a new display cycle. If the pulse generator is examined other than in this period, an all zeros words will be sent to the processor. A complete display operation, even for a maximum content display, should take less than the 16.7 millisecond interval, and the control routines are thus performed between the end of a display operation and the next sync pulse. If insufficient time remains to complete the required control routines prior to the next sync pulse, a single display cycle could be missed, but this will cause a barely noticeable flicker on the cathode ray tube.

Figure 5:
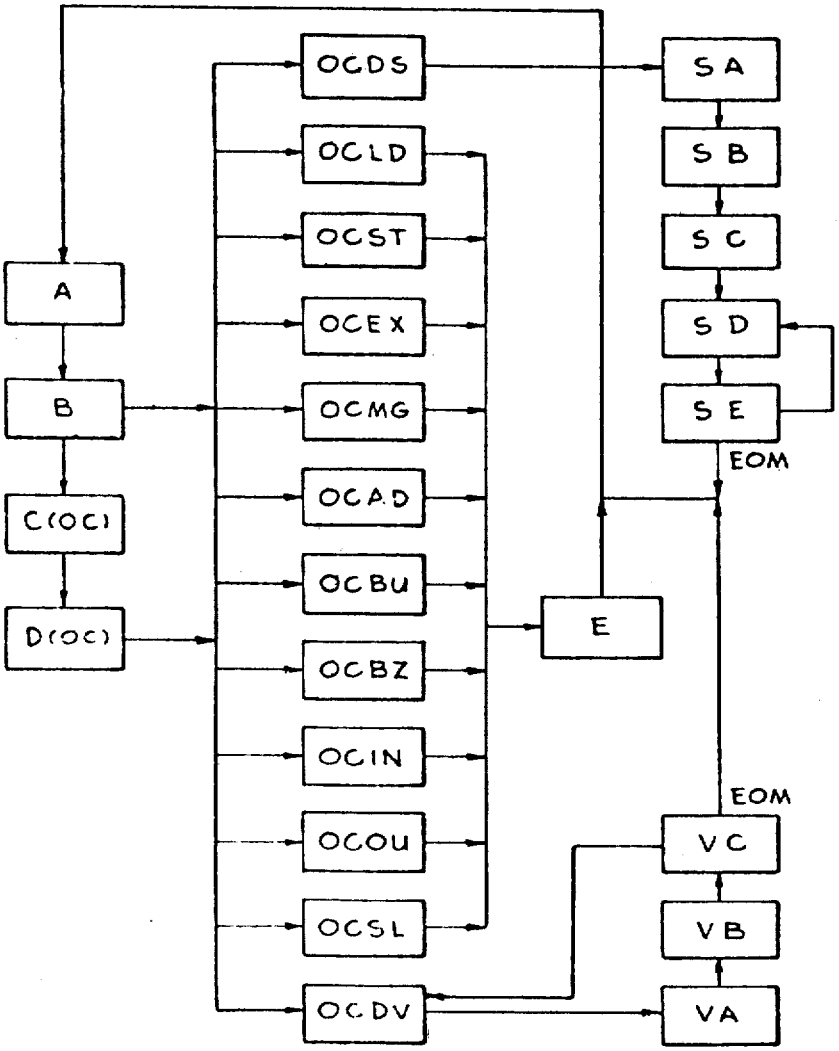
FIG. 5 is a flow chart illustrating the various states defined in response to each of an exemplary group of instructions.

Attention is now called to FIG. 5, which illustrates the respective S register states defined in the execution of the various instructions previously referred to. For the purpose of clarity, each of these states will be represented by a single letter or combination of letters.

The execution of any instruction can be considered as starting in state A, with the instruction address (IA) stored in the Y and M registers and the instruction having just been read from memory stored in the E register. If a direct addressing mode is defined, State Chart I suggests the transfer operations necessary to bring the operand into the E register.

Each line on the chart indicates the contents of the registers between timing (clock) pulses supplied by means 32. It is assumed that the Read memory operation actually occurs just after the M register has received a new address and the resultant word read into the E register is shown.

STATE CHART I

| State | M | E | Y | Notes |
|---|---|---|---|---|
| A | IA | OC/D/OA | IA | Read memory. |
| B | IA | OC/D/OA | IA | Write memory. |
| OC— | OA | Op | IA | Read memory. |

where OA represents the address of the operand (Op), OC defines the operation code, and D specifies the direct address mode.

If an indirect addressing mode is defined, State Chart II defines the operations:

STATE CHART II

| State | M | E | Y | Notes |
|---|---|---|---|---|
| A | IA | OC/I/OAA | IA | Read memory. |
| B | IA | OC/I/OAA | IA | Write memory. |
| C(OC) | OAA | OA | IA | Read memory. |
| D(OC) | OAA | OA | IA | Write memory. |
| OC— | OA | Op | IA | Read memory. |

where OAA represents the address of the location storing OA. From State Charts I and II it should be apparent how an operand is brought into the E register.

In order to suggest the register transfers required in the course of actually executing an instruction after the operand has been brought to the E register, State Charts III and IV are set forth, which respectively describe the add and load instructions which can be considered to be typical of all of the instructions other than the display instructions.

STATE CHART III.—AD

| State | M | E | Y | X | Notes |
|---|---|---|---|---|---|
| OCAD | OA | Op | IA | x | Read. |
| E | OA | Op | IA | Op+x | Write. |
| A | NIA | NI | NIA | Op+x | Read. |

STATE CHART IV.—LD

| State | M | E | Y | X | Notes |
|---|---|---|---|---|---|
| OCLD | OA | Op | IA | x | Read. |
| E | OA | Op | IA | Op | Write. |
| A | NIA | NI | NIA | Op | Read. |

where NIA represents the address of NI, the next instruction.

It is pointed out that the last line of State Charts I and II is the same as the first line of State Charts III and IV. In executing the add instruction as described by State Chart II, after state OCAD, the operand which was previously read is written back into memory. During state OCAD, the contents of the E and X registers are applied to the adder, and the sum is stored in the X register by the next clock pulse so that the registers will have the contents illustrated in state E. In response to the next clock pulse, the contents of the Y register are incremented to define the next instruction address (NIA) and transferred to the M register, and the memory is read to place the next instruction in the E register. The register transfers required to execute the load instruction should be apparent from the foregoing.

Attention is now called to State Charts V and VI, which respectively describe the states defined during the execution of the display symbol and display vector instructions.

As with all of the instructions, during the initial size (state OCDS for the display symbol instruction), the operand address is in the M register and the operand in the E register. The initial operand constitutes the initial X coordinates. In response to the clock pulse prior to state SA, the X coordinate is transferred to the X register. On the clock pulse prior to state SB, the operand address is incremented and the Y coordinate is read into the E register. On the clock pulse prior to state SC, the contents of the E register are transferred to the Y register, and the cathode ray tube beam is positioned at the coordinates specified in the X and Y registers. The cathode ray tube beam is still blanked. On the clock pulse prior to state SD, the operand address is again incremented to OA+2 and the memory read to lead the symbol code into the E register. On the clock pulse prior to state SE, the symbol code in the E register is transferred to the C register. A strobe symbol signal is then generated to cause the symbol to be displayed at the position identified by the X and Y coordinates.

The clock pulse following state SE will normally add a constant ($k_1$) to the X register to provide for horizontal symbol spacing on the cathode ray tube, increment the

STATE CHART V

| State | M | E | X | Y | C | Notes |
|---|---|---|---|---|---|---|
| OCDS | OA | Op-X | ---- | ---- | ---- | Read. |
| SA | OA | Op-X | X | ---- | ---- | Write. |
| SB | OA+1 | Y | X | ---- | ---- | Read. |
| SC | OA+1 | Y | X | Y | ---- | Write. |
| SD | OA+2 | $S_1$ | X | Y | ---- | Read. |
| SE | OA+2 | $S_1$ | X | Y | $S_1$ | Write/symbol strobe. |
| SD | OA+3 | $S_2$ | $X+k_1$ | Y | $S_1$ | Read. |
| SE | OA+3 | $S_2$ | $X+k_1$ | Y | $S_2$ | Write/symbol strobe. |
| SD | OA+4 | $S_3$ | $X+2k_1$ | Y | $S_2$ | Read. |
| SE | OA+4 | $S_3$ | $X+2k_1$ | Y | $S_3$ | Write/symbol strobe. |
| SD | OA+5 | $S_4$ | zero | $Y+k_3$ | $S_3$ | Read. |
| SE | OA+5 | $S_4$ | zero | $Y+k_2$ | $S_4$ | Write/symbol strobe. |
| SD | OA+6 | $S_5$* | $k_1$ | $Y+k_3$ | $S_4$ | Read. |
| SE | OA+6 | $S_5$* | $k_1$ | $Y+k_2$ | $S_5$* | Write/symbol strobe. |
| A | DRC | (DRC) | OA+6 | DRC | $S_5$* | Read. |

*Contains FOM bit true.

M register and read the next word, and return the state register to state SD. If the magnitude of the X coordinate is at its maximum, meaning that the symbol being displayed is at the right-most position on a line, the X coordinate is reduced to zero. In this event, the Y coordinate is incremented (i.e., $Y+k_2$). Chart V arbitrarily assumes that the original X coordinate was such that $X+2k_1$ placed symbol $S_3$ at the right side of the screen, causing symbol $S_4$ to be the first symbol of a new line beginning at $x=0$ and $y=Y+k_2$.

On the clock pulse following state SE, the symbol is examined to determine whether it contains an "EOM" bit. If it does, state A is next defined. Otherwise the processor remains in a loop between states SD and SE continuing to access new symbol codes. As many loops as are required will occur until an EOM bit is located. State Chart V arbitrarily assumes that symbol code $S_3$ includes the EOM bit.

On the clock pulse prior to state A, the address of a "display recovery cell" (DRC) is forced into the Y and M registers and the memory is read to bring the contents of this cell into the E register ready for execution. This cell stores the first instruction in a display recovery routine which will be discussed hereinafter. It should also be noted that the contents of the M register are transferred to the X register at this time, leaving the address of the last word displayed in the X register when execution of the next instruction is begun.

If the marker bit (bit 1) had been true in any of the symbol codes, the clock pulse prior to state SE would have transferred a marker code into the C register instead of the symbol code from the E register. The original code would be written back into memory, however.

State Chart VI describes the execution of the display vector instruction.

The display vector state chart can be explained in substantially the same manner as the previous state charts, it being recalled that a vector string consists of successive pairs of X and Y coordinates which will be displayed with lines drawn therebetween if an unblank bit is carried by the X coordinate. If the Y coordinate carries an EOM bit, then branching occurs from state VC to state A. Otherwise, the system will loop from state VC to state OCDV.

STATE CHART VI

| State | M | E | X | Y | C | Notes |
|---|---|---|---|---|---|---|
| ICDV | OA | Op-$X_1$ | ---------- | ---------- | ---------- | Read. |
| VA | OA | Op-$X_1$ | $X_1$ | ---------- | ---------- | Write. |
| VB | OA+1 | $Y_1$ | $X_1$ | ---------- | ---------- | Read. |
| VC | OA+1 | $Y_1$ | $X_1$ | $Y_1$ | -------- | Write. |
| OCDV | OA+2 | $X_2$ | $X_1$ | $Y_1$ | -------- | Read/move beam. |
| VA | OA+2 | $X_3$ | $X_3$ | $Y_1$ | -------- | Write. |
| VB | OA+3 | $Y_3$ | $X_3$ | $Y_1$ | -------- | Read. |
| VC | OA+3 | $Y_2$ | $X_3$ | $Y_3$ | -------- | Write. |
| OCDV | OA+4 | $X_3$ | $X_3$ | $Y_3$ | -------- | Read/move beam. |
| VA | OA+4 | $X_2$ | $X_3$ | $Y_3$ | -------- | Write. |
| VB | OA+5 | $Y_3$* | $X_3$ | $Y_3$ | -------- | Read. |
| VC | OA+5 | $Y_3$* | $X_3$ | $Y_3$* | -------- | Write. |
| A | DRC | (DRC) | OA+2 | DRC | -------- | Read/move beam. |

*Contains EOM bit true.

It should, of course, be understood that similar state charts could be provided to help describe the execution of each instruction. However, such additional charts have not been included, since their structures should be apparent from what has been said thus far. Although the exact manner of execution of each instruction is not critical to the invention and, for that matter, the selected instruction set is somewhat arbitrary, it is significant that some of the registers, herein the M, E, S, X, and Y registers, are used both for processing and display purposes.

With the exemplary instructions set forth heretofore, all of the control operations disclosed in the aforecited patent application can be executed, and in addition other control operations, such as "make space," can be executed without requiring any hardware modification. A "make space" operation can be used where an operator desires to insert some words within a page of text material. This operation effectively increases the Y coordinate, by one line, of all information following the marker code, thus leaving a blank line in which the operator can insert information.

It will be noted that both the display symbol and display vector instructions terminated with the address DRC in the M register and the contents of this address in the E register. These contents comprise the initial instruction in a display recovery routine which serves to test the cell following the last displayed address for a BOV or BOS code. If neither, a BOS or BOV code is provided, then whatever code is provided is interpreted as an end of page (EOP) code, which causes an exit to box 64 in FIG. 2 for data checking. The display recovery routine is executed in the steps depicted by box 62 of FIG. 2 and is described by the instruction sequence in Program List I. It is assumed in Program List I that the memory location named ONE contains the number "1."

PROGRAM LIST I

| | Location | Operation code | Option | Address |
|---|---|---|---|---|
| (1) | DRC | AD | D | ONE |
| (2) | DRC+1 | ST | D | T1 |
| (3) | DRC+2 | AD | D | ONE |
| (4) | DRC+3 | ST | D | T2 |
| (5) | DRC+4 | LD | I | T1 |
| (6) | DRC+5 | AD | D | BOSC |
| (7) | DRC+6 | BZ | D | SDR |
| (8) | DRC+7 | LD | I | T1 |
| (9) | DRC+8 | AD | D | BOVC |
| (10) | DRC+9 | BZ | D | DVR |
| (11) | DRC+10 | BU | | TCK |
| (12) | DSR | DS | I | T2 |
| (13) | DVR | DV | I | T2 |

In response to the initial instruction, the last displayed address (LDA) which was stored in the X register (see State Charts V and VI) is incremented by one to form LDA+1. Instruction (3) also increments the X register to form 2DA+2 which is stored by instruction (4) in a second temporary storage cell T2. Instruction (5) then loads the contents of the address in T1 (i.e., LDA+1) into the X register, and by instructions (6) and (7) tests to determine whether the contents are a BOS code. This is done by adding the complement of a BOS code (stored in cell BOSC) to the X register [instruction (6)] and then branching [instruction (7)] to a display symbol routine (DSR) address in the event the contents of the X register are zero. Assuming that instruction (7) does not cause a branching, instruction (8) again loads the contents of the address stored in cell T1 into the X register and instructions (9) and (10) test to determine whether it is a BOV code. If it is not, then instruction (11) causes an unconditional branching to TCK, a test control keyboard routine depicted in box 64 (FIG. 2) to check for data. The DSR and DVR addresses to which branching could occur in response to instructions (7) and (10) respectively store DS and DV instructions specifying that the operand is to be found in the address stored in location LDA+2 which comprises the contents of cell T2.

The TCK routine functions to check the control keyboard for data. If a key has been actuated, a table lookup is performed to find the location of the initial address in the routine identified by the actuated key. The TCK routine is described by Program List II. Prior to considering it in detail, let it be assumed that the following named memory locations have been loaded with the identified information:

| Location | Name | Contents |
|---|---|---|
| SCK | | Select control keyboard code. |
| TPK | | First word of test program keyboard routine. |
| CCT+n | | nth entry in control key address table. |

PROGRAM LIST II

| | Location | Operation code | Option | Address |
|---|---|---|---|---|
| (1) | TCK | SL | D | SCK |
| (2) | TCK+1 | IN | D | T1 |
| (3) | TCK+2 | LD | D | T1 |
| (4) | TCK+3 | BZ | D | TPK |
| (5) | TCK+4 | AD | D | CCT |
| (6) | TCK+5 | ST | D | T1 |
| (7) | TCK+6 | LD | I | T1 |
| (8) | TCK+7 | ST | D | T1 |
| (9) | TCK+8 | BU | I | T1 |

In response to instruction (1), the select flip-flop associated with the control keyboard is set, and in response to instruction (2) the data (e.g., "n") defined by the actuated control key is put into cell T1. Instruction (3) then loads this data (n) into the X register. If the data is equal to zero (meaning that no control key has been actuated), then instruction (4) causes a branch to a test program keyboard (TPK) routine. Assuming, however, that the X register contains non-zero data, then it is added by instruction (5) to the first address CCT in a look-up table. Instruction (6) stores the sum in cell T1, and then the information stored in cell CCT+n is loaded into the X register by instruction (7) and then stored in cell T1 by Instruction (6) stores the sum in cell T1, and then the incomprise the address of the first word in the control routine, e.g., "copy word," to be executed. Instruction (9) then causes an unconditional branching to this routine.

It has been assumed that box 64 (FIG. 4) begins with a Test Control Keyboard routine, followed by a Test Program Keyboard routine. Routines similar to Program List II will exist in box 84 to sequentially select each peripheral device and test it for data. Box 88 would begin similarly, but instruction (4) (Program List II) would be BZ/D/TCK, branch back to the beginning of box 84 if no sync pulse, and instruction (5) would be BU/D/DIS, branch to beginning of display routine (box 72).

Box 74 will end with the address of the first BOS or BOV in the X register and a branch to DRC, box 56 (Program List I). Thus, it should be appreciated that, regardless of whether box 76 is entered from box 74 or 82, the initial conditions in box 76 will be the same.

In order to demonstrate how the indicated instruction set can be employed to perform the various control operations, a sequence of instructions operative to perform a typical control operation, i.e., "copy words," will now be considered. Box 86 (FIG. 4) will contain a plurality of such routines to be executed when box 84 determines that the corresponding keys have been pressed by the operator of the console. It will be recalled that in the "copy word" operation the operator indicates the displayed text word he wants copied by using the light gun to identify the first letter in that word. The operation then causes the code representing the first letter of the word being copied to be written into the memory location storing the marker. Both the light gun and marker addresses are then incremented, and the second letter is then copied. This loop continues until the end of the word being copied is reached, which is, of course, indicated by a space code.

Before considering the individual instructions required, let it be assumed that the following named memory locations have been loaded with the indicated information:

| Location | Name | Contents |
|---|---|---|
| LG | | Light gun address. |
| MK | | Marker address. |
| SP | | The 2's complement of a space code. |
| SM | | Symbol mask (i.e., 111111000000). |
| ONE | | "1". |
| MKB | | Word with all "0's" except for marker bit. |

Let it now be assumed that the operator actuates the "copy word" key on the program keyboard. Since this keyboard is checked by the executive routine at least once every sixtieth of a second and since the operator of necessity holds the key for at least a sixtieth of a second, there is no need to store the control request. When Program List II (box 84) detects a non-zero word, instruction (9) causes a branch to the first word of the controlled routine, assumed in this case to be location CPW.

Utilizing the contents of the above memory locations and the previously introduced instruction set, a copy word routine can be executed in accordance with the following:

PROGRAM LIST III

| | Location | Operation code | Option | Address |
|---|---|---|---|---|
| (1) | CPW | LD | I | LG |
| (2) | | ST | I | MK |
| (3) | | LD | D | LG |
| (4) | | AD | D | ONE |
| (5) | | ST | D | LG |
| (6) | | LD | D | MK |
| (7) | | AD | D | ONE |
| (8) | | ST | D | MK |
| (9) | | LD | I | LG |
| (10) | | EX | D | SM |
| (11) | | AD | D | SP |
| (12) | | BZ | D | EXIT |
| (13) | | BU | D | CPW |
| (14) | EXIT | LD | D | LG |
| (15) | | AD | D | ONE |
| (16) | | ST | D | LG |
| (17) | | LD | D | MK |
| (18) | | AD | D | ONE |
| (19) | | ST | D | MK |
| (20) | | LD | D | MK |
| (21) | | MG | D | MKB |
| (22) | | ST | D | MK |
| (23) | | BU | D | TCK |

Instruction (1) in the copy word routine is an indirect load instruction which causes the operand in the location whose address is in location LG to be accessed and put into the accumulator (X register). This operand is, of course, the symbol which was light gunned by the operator and is the first symbol to be copied. The second instruction is an indirect instruction calling for the contents of the accumulator to be stored in the location whose address is in the MK location. Thus, with the first two instructions, the initial symbol in the word to be copied is stored in the location holding the marker bit. With instruction (3), the light gun address in the LG location is loaded into the accumulator, and with instruction (4) the accumulator is incremented by one. With instruction (5) the incremented light gun address is returned to location LG for subsequent use. Instructions (6), (7), and (8) similarly operate on the marker address to increment it by one and return it to the MK location. Instructions (9), (10), and (11) are used to determine whether the symbol stored in the location represented by the new address in location LG is a space code. More particularly, instruction (9) is an indirect instruction which loads the symbol stored in the address in location LG into the accumulator. Instruction (10) calls for an extract instruction with the symbol mask word stored in location SM. It will be recalled that the extract instruction causes the bit-by-bit logical "and" of the operand (i.e., the symbol mask word) and the contents of the accumulator to be placed in the accumulator. Accordingly, all bits in the accumulator will be masked out except for those bits carrying the symbol information itself, which it will be recalled from FIG. 3 are bits 6 through 11. The contents remaining in the accumulator are then added with the contents of location SP by instruction (11). Location SP stores the 2's complement of a space code and consequently, if a space code is stored in the new light gun address, the accumulator will contain all 0's at the end of instruction (11). Instruction (12) is a branch on zero instruction which, if the accumulator contains all 0's, will cause the next instruction to be taken from the exit location which contains the first instruction in an exit routine. If the accumulator does not contain all zeros, then instruction 13 will be executed next, which will unconditionally branch the program back to instruction (1) to therefore copy the next symbol in the word.

The exit routine is used to increment the light gun and marker addresses and to move the marker bit to a subsequent location. The initial instruction, instruction (14), calls for loading the light gun address into the accumulator, and instruction (15) increments the accumulator by one so that it now contains an address which represents the location immediately subsequent to that containing the space code. Instruction (16) stores this new light gun address back into the location LG. Instructions (17), (18), and (19) similarly increment the marker address stored in location MK. Instruction (20) is an indirect load instruction which functions to load the word stored in the location identified by the contents of location MK into the accumulator. Instruction (21) is a direct merge instruction defining as an operand address the location MKB which stores a word with all 0's except for the marker bit. The merge instruction causes the bit-by-bit logical "or" of the operand and the contents of the accumulator and thus introduces a marker bit into the word previously in the accumulator. Instruction (22) then causes this word to be stored in the location whose address is stored in location MK. Instruction (23) causes the program to branch unconditionally to the executive routine, box 64 of FIG. 4, which was previously discussed.

It should be noted that all of the program described and the entire routine in FIG. 4 can be exectued in a small fraction of a second. When human reaction time is considered, the operator sees a "continuous" display, which "instantly" changes in response to his commands via the keyboards.

From the foregoing, it should be appreciated that a display and control console has been disclosed herein which employs stored program data processing techniques to perform both display and control operations. By utilizing a stored program technique, the amount of hardware required over previously known consoles to perform the same functions is considerably reduced. Consequently, the system is inherently more reliable than previously known systems for performing similar over-all functions. Moreover, even more significant is the fact that a console constructed in accordance with the present invention is extremely flexible inasmuch as new control capabilities can be introduced merely by writing new routines and introducing them into memory instead of modifying the hardware as was previously required.

It should be appreciated that those familiar with the art may make modifications in the arrangements as shown herein without departing from the spirit of the invention. Therefore, all such modifications and equivalents are deemed to fall within the scope of the invention as claimed in the appended claims.

The embodiments of the invention in which an exclusive property or privilege is claimed are defined as follows:

1. A control and display console adapted to be used by an operator for communication with a digital computer, said console including:

a processor section;

said processor section including a memory having a plurality of word storage locations, first and second registers, and a control means;

said memory storing a plurality of instruction words and a plurality of operand words, said instruction words each defining an operation to be performed with respect to an identified one *or more* of said words, said operand words defining symbol and position information;

means for sequentially accessing said instruction words;

said control means being responsive to said accessed instruction words for causing the operations defined thereby to be performed on the identified words;

said instruction words including at least one display instruction word identifying an initial memory location in a string of memory locations;

said control means being responsive to said display instruction for sequentially accessing said string of memory locations;

means for storing position information accessed from said string of memory locations in said first and second registers;

a display section;

said display section including a cathode ray tube having horizontal and vertical deflection means; and means respectively coupling said first and second registers to said horizontal and vertical deflection means.

2. The console of claim 1 further including:

a third register;

means for storing symbol information accessed from said string of memory locations in said third register;

symbol generator means responsive to said symbol information stored in said third register; and means coupling said symbol generator means to said cathode ray tube for controlling the beam thereof.

3. The console of claim 1 including a memory address rigister for defining locations in said memory and an exchange register for holding information read from and to be written into said memory;

said exchange register having an input data bus and an output data bus;

a plurality of input devices;

a plurality of output devices;

a plurality of gating means each either coupling one of said input devices to said input data bus or one of said output devices to said output data bus;

said gating means being selectively enabled in response to said control means.

4. The console of claim 1 including means blanking said cathode ray tube when said control means is operating in response to any of said instruction words other than said display instruction word.

5. A control and display console adapted to be used by an operator for communication with a digital computer, said console including;

a processor section;

said processor section including a memory having a plurality of word storage locations, a plurality of registers, and a control means;

said memory storing at least one display instruction, a plurality of other instructions defining an executive program and a plurality of control routines each comprised of a unique sequence of instructions;

means for accessing instructions from said memory;

control means responsive to said accessed instructions for accessing other ones of said instructions in accordance with a defined sequence;

said control means also being responsive to operations defined by said instructions for causing said operations to be performed;

said executive program including a first sequence of instructions for causing the operations defined by said display instruction to be performed;

a control data source controllable by said operator for identifying one of said control routines;

said executive program including a second sequence of instructions for causing said control data source to be examined and for initiating the execution of the control routine identified thereby.

6. The console of claim 5 wherein said display instruction identifies an initial memory location in a string of memory locations;

said control means being responsive to said display instruction for sequentially accessing said string of memory locations;

means for storing information accessed from said string of memory locations in a first and a second of said plurality of registers;

a display section;

said display section including a cathode ray tube having horizontal and vertical deflection means; and means respectively coupling said first and second registers to said horizontal and vertical deflection means.

7. A control and display console adapted to be used by an operator for communication with a digital computer, said console including;

a memory having a plurality of word storage locations;

an executive program comprised of a plurality of instruction words stored in said memory;

at least one display instruction word stored in said memory;

a plurality of control routines stored in said memory, each comprised of a plurality of instruction words;

a plurality of display information words stored in said memory;

means for accessing an initial one of said executive program instruction words;

a control means responsive to instruction words accessed from said memory for executing operations identified thereby;

a control keyboard including a plurality of operator actuatable keys each identifying a different one of said control routines;

a display device;

said control means being responsive to said display instruction word for causing said display device to display information represented by said display information words stored in said memory;

said executive program causing the periodic execution of the operation identified by said display instruction word and causing control routines identified by the actuation of said keys to be executed between said periodic executions.

8. The console of claim 7 including a plurality of word storing registers including a memory address register for defining memory locations and an exchange register for holding information to be written into or read from said memory;

said exchange register having a data input bus and a data output bus;

said control keyboard connected to said data input bus.

9. The console of claim 7 including a memory address register for defining memory locations and an exchange address register for holding information to be written into or read from said memory;

a state register;

means defining the state of said state register in response to information read from said memory;

said control means being responsive to the state defined by said state register for affecting transfers between said registers.

10. The console of claim 9 wherein said display device comprises a cathode ray tube having vertical and horizontal deflection means;

said plurality of registers including first and second registers for respectively controlling said vertical and horizontal deflection means.

11. The console of claim 9 including a third register;

a symbol generator responsive to information stored in said third register; and means coupling said symbol generator to said cathode ray tube.

12. In a control and display console;

a data processing section including timing means and a memory means comprised of a plurality of data storing locations variously containing control routine instructions, operand words, and words representing output data to be displayed, which output data is derived from said selected operand words and selected instructions;

display means controlled by said timing means and said memory means for selectively displaying on a cyclically refreshed basis said output data;

a manually operable control keyboard coupled to said data processing section for selectively addressing control routine instructions; and means included in said data processing section, and responsive to said keyboard, executing a selectively addressed control routine between the cycle during which said display means is refreshed.

13. In a control and display console:

a data processing section including timing means and a memory means comprised of a plurality of data storing locations variously containing instructions associated to define control routines, and words representing output data to be displayed;

display means controlled by said timing means and said memory means for selectively displaying on a cyclically refreshed basis said output data;

a manually operable control keyboard coupled to said data processing section for selectively addressing control routine instructions; and means included in said data processing section, and responsive to said keyboards, executing the control routine defined by said selectively addressed control routine instruction between the cycles during which said display means is refreshed for modifying said output data.

14. A control and display console including:

a memory means storing a plurality of operand words describing information to be displayed;

a means for reading words from and writing words into said memory means;

a display means;

said memory means also storing a program comprised of a plurality of instruction words each defining an operation to be performed on one or more specified operand words, at least one of said instruction words defining a display operation; and a control means responsive to said instruction word defining a display operation being read from said memory means for causing information described by the operand words specified thereby to be displayed by said display means.

15. The console of claim 14 including a plurality of registers and wherein said control means is responsive to each instruction word read from said memory for performing the operation defined thereby and for loading said registers with data representing the results of said operations;

said display means being responsive to data stored in said registers.

*16. The invention in accordance with claim 1, wherein said words are stored in different word storage locations, and wherein each instruction word contains address information to which said control means is responsive for accessing the particular word storage location or locations containing the identified one or more words on which the operation defined by an instruction word is to be performed.*

*17. The invention in accordance with claim 16, wherein each word storage location of said memory is separately accessible by said control means, and wherein only one of said words is stored in each storage location.*

*18. The invention in accordance with claim 1, wherein said control means includes common addressing and transferring means for accessing both operand and instruction words stored in said memory.*

*19. The invention in accordance with claim 14, wherein said control means includes common means for addressing and accessing the operand and instruction words stored in said memory means, and wherein a plurality of said instruction words define non-display type operations which are selectively accessible by said control means for modifying the operand words stored in said memory means to permit changing the information displayed by said display means.*

References Cited

The following references, cited by the Examiner, are of record in the patented file of this patent or the original patent.

UNITED STATES PATENTS

| | | | |
|---|---|---|---|
| 3,329,948 | 7/1967 | Halsted | 340—324 |
| 3,293,614 | 12/1966 | Fenimore et al. | 340—172.5 |
| 3,205,344 | 9/1965 | Taylor et al. | 235—154 |
| 3,187,321 | 6/1965 | Kameny | 340—345 |
| 3,085,132 | 4/1963 | Innes | 178—30 |
| 3,037,192 | 5/1962 | Everett | 340—172.5 |

GARETH D. SHAW, Primary Examiner

U.S. Cl. X.R.

340—324 A